United States Patent [19]
Price

[11] Patent Number: 5,562,460
[45] Date of Patent: Oct. 8, 1996

[54] VISUAL EDUCATIONAL AID

[76] Inventor: Jon R. Price, 1773 Wells Branch Pkwy., #1221, Austin, Tex. 78728

[21] Appl. No.: 340,731

[22] Filed: Nov. 15, 1994

[51] Int. Cl.⁶ .................................................. G09B 19/00
[52] U.S. Cl. ........................ 434/433; 434/150; 434/188
[58] Field of Search .................................. 434/130, 150, 434/151, 153, 188, 433

[56] References Cited

U.S. PATENT DOCUMENTS

| | | |
|---|---|---|
| 232,261 | 9/1880 | Gross . |
| 317,801 | 5/1885 | Knorr . |
| 1,220,098 | 3/1917 | Hass ........................................ 434/150 |
| 1,795,796 | 3/1931 | Pleasants . |
| 2,177,790 | 10/1939 | Scott . |
| 3,173,217 | 3/1965 | Schultz . |
| 4,115,930 | 9/1978 | Beck ................................... 434/151 X |
| 4,673,197 | 6/1987 | Shtipelman et al. . |
| 4,822,283 | 4/1989 | Roberts .................................. 434/171 |
| 4,972,319 | 11/1990 | Delorme . |
| 5,030,117 | 7/1991 | Delorme . |
| 5,108,115 | 4/1992 | Berman et al. . |
| 5,259,763 | 11/1993 | Wendel et al. ......................... 434/150 |
| 5,275,568 | 1/1994 | Pfuetze ................................... 434/153 |

*Primary Examiner*—Cary E. O'Connor
*Assistant Examiner*—Jeffrey A. Smith
*Attorney, Agent, or Firm*—J. Nevin Shaffer, Jr.; Shaffer & Culbertson

[57] ABSTRACT

A visual teaching aid (10) that allows educators to relate similarities and differences between differing topics and between subtopics within a single topic. The visual teaching aid includes a map (14) and a plurality of labels (16). Contained on the map (14) are a plurality of geographic features (18) such as continents, countries, states, cities, islands, oceans, seas, gulfs, harbors, rivers, lakes, islands, and peninsulas. These geographic features (18) appear as those on a normal map but are preferably not related to actual geographic features (18). Each label (16) associates with a particular geographic feature (18) and also describes an educational topic or subtopic. The labels (16) are logically arranged such that similar topics and subtopics reside in closer proximity to one another than do differing topics and subtopics. Also included with the present invention is a coordinate system (82) for locating geographic features (18) on the map (14). The coordinate system (82) includes horizontal (84) and vertical (88) grid lines that preferably creates a number of squares (92). The squares (92) may be used to relate the relative size of numbers. The visual aid (10) may be constructed of substantially rigid materials so that it could be hung from a wall in a classroom. The visual aid (10) may also be implemented upon a computer such that the visual aid (10) is displayed on a computer screen.

11 Claims, 2 Drawing Sheets

VISUAL EDUCATIONAL AID

BACKGROUND OF THE INVENTION

This invention relates to an educational aid. More particularly, this invention relates to a visual aid that allows students and educators to visually associate educational topics with imaginary geographical features.

Educators have long struggled with coordinating and teaching the numerous and differing topics taught in our schools. Topics such as math, science, art, English, and history differ in many ways from each other. Certain topics may be so unrelated that no commonality exists between the topics. Further, particular subtopics within a topic may differ so greatly from one another that their only similarity seems to be the common topic under which they are categorized.

On the other hand, many topics and subtopics are so interrelated that in order to understand one topic, a knowledge of the building blocks of another topic is required. In this sense, some topics are interdependent with other topics. Unfortunately, segmentalization in teaching has become the rule and, therefore, individual topics and subtopics, even though highly related, are taught in isolation. Therefore, the integration of topics during the learning process is often absolutely necessary to the learning process.

The importance of integrating topic learning is seen notably in math and the sciences. In these areas, failing to acquire and integrate earlier skills and understandings can preclude learning later skills and understandings. For example, before students can begin understanding the basic science concept of speed as distance over time, they must have basic skills and understandings from such already interrelated math topics as division, multiplication, fractions, and ratios. Depending upon the specific situation, knowledge may also be required in scientific methods and measurement, logical analysis, general problem solving, and vocabulary.

As the student progresses, the importance of topic integration increases. More advanced students are often required to solve problems in the sciences that have a large math component. Solving these problems requires a knowledge of not only the scientific laws involved but a solid understanding of the mathematics required to solve the problem. This requires the student to have a detailed memory of topics previously learned within the subject as well as dependent learnings from other math or science areas already studied. Often times, the student has sufficient knowledge to solve a particular problem but cannot access the information that is required. Good students typically have learned strategies for locating and organizing information that stems from differing areas and are therefore more successful in solving the problems. Poorer students, on the other hand, may have an equal understanding of the specific areas but be unable to access and organize the required information.

The problems of topic isolation and topic interdependence together provide a great many of the challenges of learning. Because topics and subtopics intricately interrelate with one another, educators and students often struggle to define boundaries. Once established, these boundaries seem artificial and contrived. From a student's perspective, the segmentalized teachings seem to stand apart thereby promoting the notion that the differing topics do not relate to one other. Topic isolation often leads students to believe that proficiency or lack of proficiency in one topic will not affect their performance in other topics. As one skilled in the art will appreciate, however, true competence and mastery requires a broad knowledge base, and proficiency in a single area rarely is useful by itself.

The result of the segmentalizing of topics invariably means a sacrifice of holistic understanding in return for the ease of teaching individual topics. Sacrificing holistic understanding, however, is only a result and not a requisite of the segmentalized teaching process. While the tradeoff has helped teachers teach, it has caused students to think in a segmentalized manner. The segmentalization of topics will always provide the basis of teaching practice. However, in order to provide a holistic understanding, the topics must be consistently and powerfully interrelated with one another after they have been taught.

SUMMARY OF THE INVENTION

It is, therefore, a general object of the invention to overcome the above described limitations, and others, of the prior teaching devices and techniques. More particularly, it is an object of the invention to provide a visual aid that consistently encourages a student to understand how differing topics and subtopics relate to one other.

To accomplish these objects, a visual aid of the present invention associates educational topics with geographical features. The visual reference provided by the aid enhances the students' understanding and recollection of individual educational topics and provides the student with a visual reference as to how the topics and subtopics relate to one another.

The visual aid of the present invention preferably comprises a map and a plurality of labels that relate geographical features with educational topics. The labels reside on the map such that related educational topics are in close proximity to one another and topics differing from one another reside further away from one another. The visual aid thereby provides a means for teachers to explain the relationship between educational topics and subtopics in a familiar and easy to understand manner. The visual aid also confirms the lessons relating to particular topics and subtopics by allowing the student to associate a visual reference point with a particular topic or subtopic.

The visual aid may be physically constructed of a rigid planar material, such as cardboard, or a more flexible and mostly rigid material such as plastic. Constructed in this manner, the visual aid may be hung upon a wall semi-permanently to provide a continual visual reference to the student or may be taken down to be stored. The visual aid could also be displayed on a computer screen or the like. Implemented on a computer, the visual aid could be manipulated via the computer in manners known in the art to highlight, enlarge, or perform any of a wide variety of functions on all of or portions of the map.

The map preferably includes a plurality of geographical features such as continents, countries, states, cities, islands, oceans, seas, gulfs, harbors, rivers, lakes, islands, and peninsulas. The geographical features appear as they do on actual maps. However, the geographical features are preferably not those representative of any portion of the earth but are created to maximize the benefit of the visual aid to the student.

The plurality of labels are also disposed upon the map surface so that the labels overlay the map. Each label is associated with a particular geographical feature on the map and describes a particular educational topic or subtopic. Also, preferably, a grid is provided that allows a user to associate locations on the map with numerical coordinates.

In a preferred embodiment, horizontal and vertical grid lines form a grid of squares.

The grid of squares may be used to convey to students the relative size of two or more numbers. To do such, each square is first assigned an arbitrary value. Then, a first number of squares representative of the size of a first number is shaded. Next, a second number of squares representative of a second number is shaded. Thus, a student may visually compare the areas representative of each number to visualize the relative size of the numbers.

The visual aid of the present invention provides many important advantages. Because each of the labels is permanently associated with a particular geographical feature on the map, the aid allows a student to visually organize each of the topics with respect to one another. Further, because the student associates the topic with a physical location on a map, the information relating to the topic becomes reinforced and is easier to recall. Further, the grid affixed to the visual aid may also be used to teach students relative number size. Preferably, the present invention is first used during a child's earliest formal education and its use continues throughout the educational process. In this fashion, the maximum benefit is extracted from the educational aid.

These and other objects, advantages, and features of the invention will be apparent from the following description of the preferred embodiments, considered along with the accompanying drawings.

DESCRIPTION OF THE PREFERRED EMBODIMENTS

Figure 1:
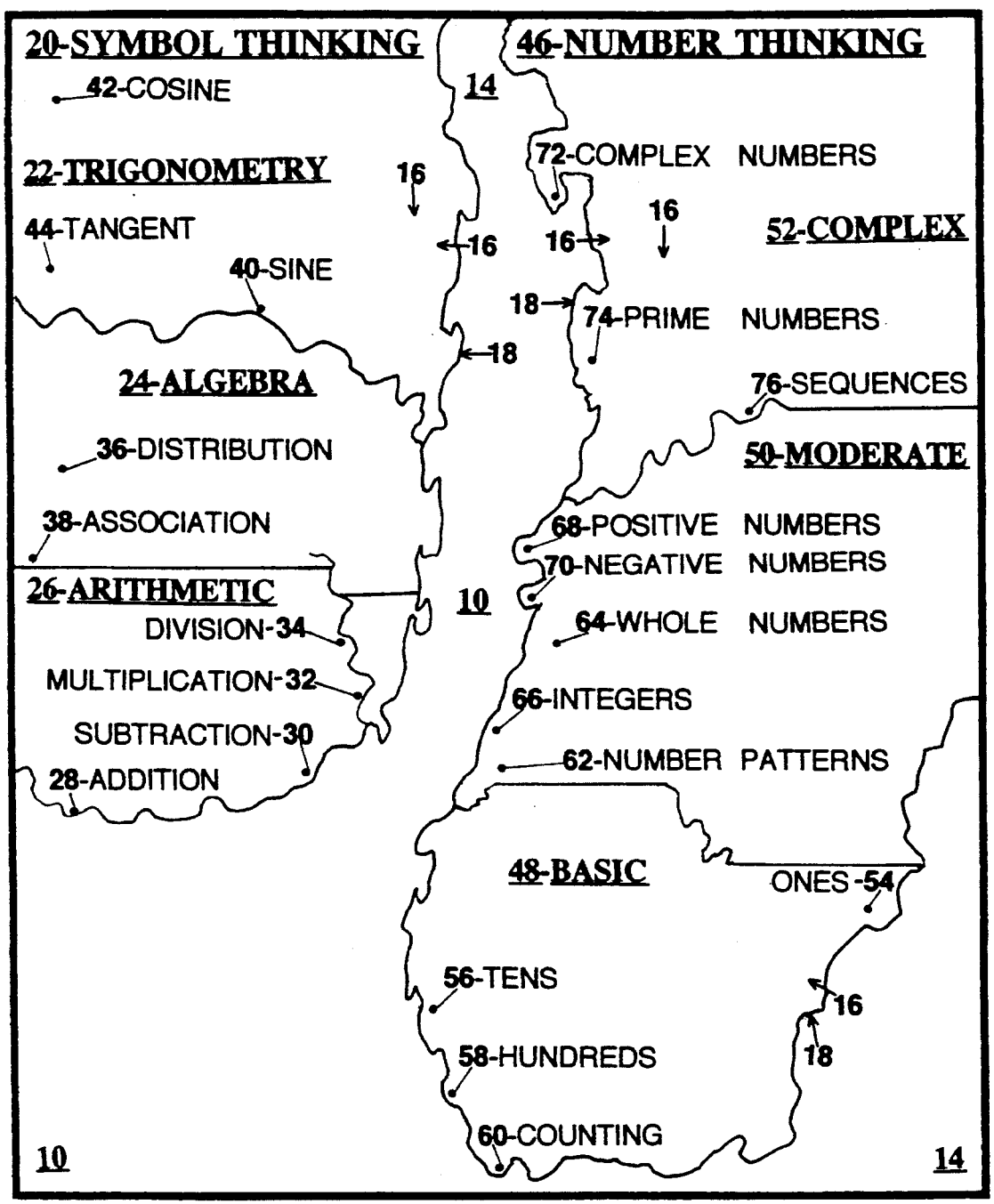
FIG. 1 is a diagram of a first visual aid embodying the principles of the present invention.
Figure 2:
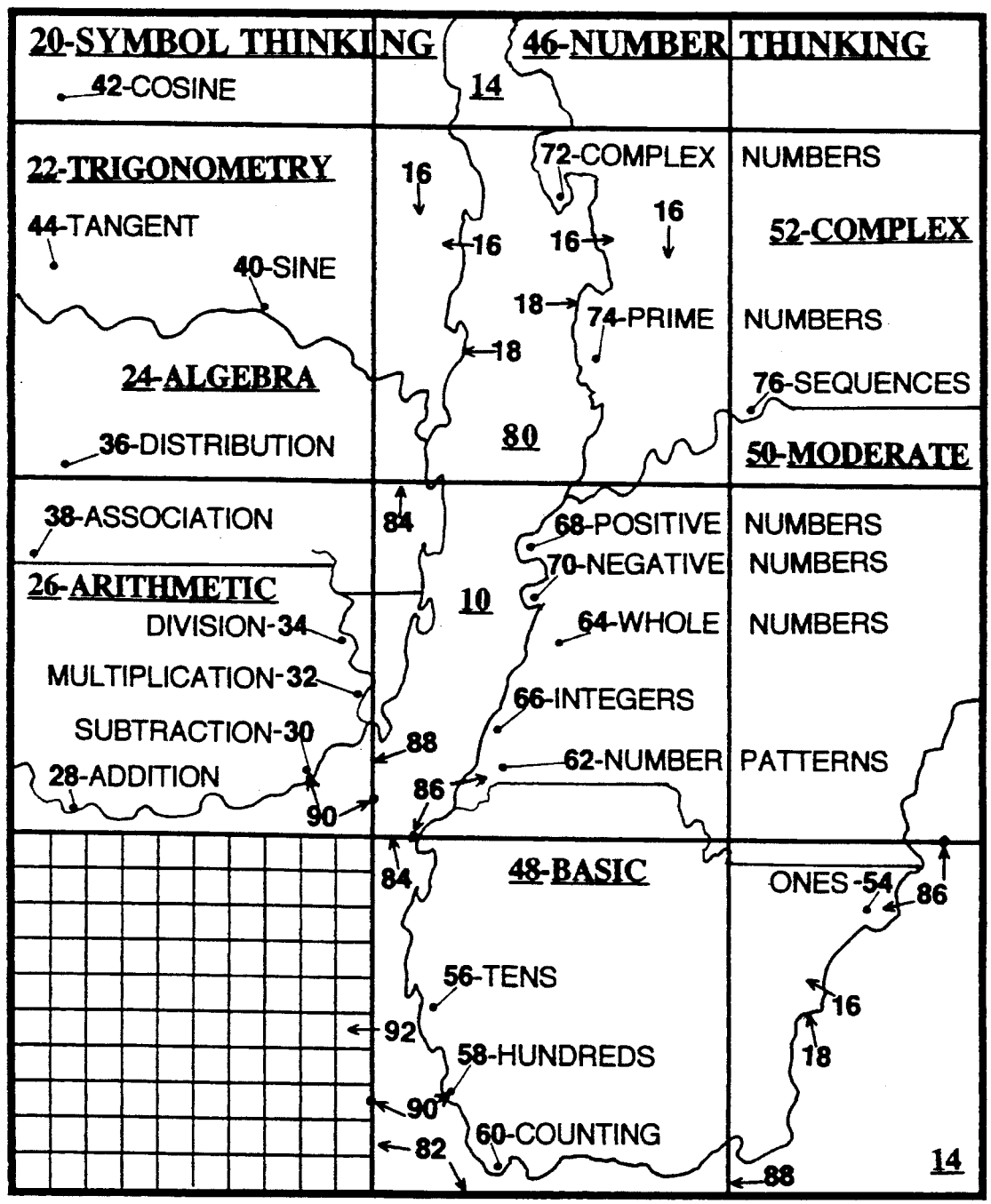
FIG. 2 is a diagram of a second visual aid embodying the principles of the present invention.

Two visual aids embodying the principles of the present invention are shown by way of illustration in FIGS. 1–2. Referring to FIG. 1, a first visual aid 10 embodying the principles of the present invention comprises a map 14 and a plurality of labels 16 disposed on the map.

The map 14 includes a plurality of geographical features 18 disposed across the map substrate 12. Preferably, these geographical features 18 include, but are not limited to, countries, states, cities, islands, oceans, seas, gulfs, harbors, rivers, lakes, islands, and peninsulas. One skilled in the art will readily appreciate that various other geographical features could be used on the map, limited only by the skill of the drafter. Preferably, also, the geographical features 18 are fictitious and not related to any actual maps. However, in some applications, it could be advantageous to use a map containing actual geographical features.

Each label 16 associates with a particular geographical feature 18 and also describes a particular educational topic. Preferably, subtopics of a single topic are grouped together on a single geographical feature 18, such as a country or continent, to demonstrate to a student that the subtopics are related. Conversely, differing topics are placed on separate larger bodies such as continents, countries, or bodies of water. Topics that are similar, such as history and social studies, are located more closely to one another than lesser related topics such as language arts and science. Thus, closely related topics, while logically separated from one another, are still related via their relative proximity.

As shown in FIG. 1, the continent of Symbol Thinking 20 includes the countries of Trigonometry 22, Algebra 24, and Arithmetic 26. Within the country of Arithmetic 26 are the towns of addition ("+") 28, subtraction ("−") 30, multiplication ("×") 32, and division "/" 34. Thus, within the country of Arithmetic 26 are the symbols relating the basic math operations, these concepts being closely related and generally taught in sequence. The adjoining country Algebra 24, while being closely related to the subjects learned in Arithmetic 26, includes the towns of Distribution 36 and Association 38, two common algebraic functions. Adjoining Algebra 24 is the country of Trigonometry 22, another topic using a variety of symbols. For example, contained within the country of Trigonometry 22 are the towns of Sine 40, Cosine 42, and Tangent 44, all symbols used in the topic of Trigonometry. As the reader will readily appreciate, each of the countries of Trigonometry 22, Algebra 24, and Arithmetic 26 use symbols extensively and therefore are all correctly classified under the continent of Symbol Thinking 20.

Also shown on FIG. 1, the continent of Number Thinking 46 includes the countries Basic 48, Moderate 50, and Complex 52. As with the countries contained within the continent of Symbol Thinking 20, the subtopics contained within each of the countries become more complex towards the top of the map 14. Within the country of Basic 48 are the towns of ones 54, tens 56, hundreds 58, and counting 60. These towns correspond to the most basic subtopics of Number Thinking 46. The country of Moderate 50 includes the towns of number patterns 62, whole numbers 64, integers 66, positive numbers 68, and negative numbers 70. Finally, the country of Complex 52 includes the subtopics of complex numbers 72, Prime numbers 74, and Sequences 76, these representing the most difficult subtopics of Number Thinking 46.

As one skilled in the art will readily appreciate, the teachings of the present invention may be readily applied to other educational topics such as science, language arts, history, science, social science, physical fitness, geography, and the fine arts. While the topical material differs in each discipline, the segmentalization and integration techniques used remain consistent.

The visual aid 10 of the present invention could be implemented in a variety of ways. In one manner, the map 14 and labels 16 could be printed or otherwise disposed on a substantially flat sheet of material such as cardboard or plastic. In another manner, the visual aid 10 could be displayed on a computer display (not shown) with the map 14 and labels 16 being layered on the computer screen. In this fashion, the visual aid 10 could be enhanced, altered, and viewed to achieve the greatest benefit.

The use of the visual aid 10 includes first discussing the content of the aid to give students an overview of the material they will learn in the coming sessions. A first topic and subtopic are then selected. The teacher educates the students in the content of the subtopic until they have mastered the subtopic. Then, the teacher refers again to the visual aid 10 to demonstrate to the students their mastery of the material and relates the particular topic and subtopic to the surrounding topics. Thus, with this critical step, the students not only associate the current teachings with a geographical location or feature but also visualize how the current teachings relate to past and future lessons. The educator repeats the above outlined steps for additional subtopics and topics after each lesson, again referring to the visual aid 10. The reinforcement provided by the visual aid 10 and the logical relationships conveyed greatly enhance the learning process.

Referring now to FIG. 2, a second visual aid 80 embodying the principles of the present invention includes the components of the first visual aid 10 and also a coordinate system that is referred to generally as 82. Preferably, the coordinate system 82 allows a user to associate a unique set of coordinates with a geographical feature 18 on the map 14. As shown in FIG. 2, the coordinate system 82 of the second embodiment includes a plurality of substantially parallel horizontal grid lines 84 extending across the map 14. Preferably, a horizontal reference number 86 uniquely associates with each horizontal grid line 84. Further, the coordinate system 82 preferably also includes a plurality of substantially parallel vertical grid lines 88 extending across the map 14 such that they orient perpendicularly to the plurality of horizontal grid lines 84. Preferably, a vertical reference number 90 uniquely associates with each vertical grid line 88.

Thus, coordinates can be determined or provided for each reference number uniquely associated with a particular geographical feature 18 contained on the map. In this fashion, when referring to geographical features 18, the educator is also instructing students how to locate points in a two dimensional reference system.

The grid lines 84 and 88 also provide another important benefit. Preferably, the horizontal grid lines 84 and the vertical grid lines 88 form a plurality of square boxes 92. These square boxes allow an educator to teach students the relative sizes of numbers. By assigning each square the arbitrary value of ten units, the instructor may shade a first number of boxes to represent a first number. Then the instructor may shade a second number of boxes to represent a second number. Once the boxes are shaded, the instructor explains that the area occupied by each group of shaded boxes represents the respective value of the number. In this fashion, the students have a firm basis for understanding the relative size of numbers.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. A visual education aid which provides visual representations of the relationship of educational topics with subtopics within educational topics and between other educational topics by means of geographical features to enhance understanding and recollection of the educational topics, the visual educational aid comprising:

(a) a map including a plurality of geographical features each having an arbitrarily defined size and being disposed across the map;

(b) a plurality of labels on the map, each label associated with a particular geographical feature on the map and describing a particular educational topic; and (c) each geographical feature related to the comparable scope of the educational topic represented thereby so that the breadth of an educational topic is represented by a correspondingly sized geographical feature.

2. The visual educational aid of claim 1 wherein the map and labels are printed upon a substantially flat sheet of material.

3. The visual educational aid of claim 2 wherein the sheet of material is substantially rigid.

4. The visual educational aid of claim 1 wherein the visual educational aid is displayed on a computer display.

5. The visual education aid of claim 1 wherein the geographical features are selected from the group consisting of continents, countries, states, cities, islands, oceans, seas, gulfs, harbors, rivers, lakes, islands, and peninsulas.

6. The visual education aid of claim 1 wherein the educational topics are selected from the group consisting of mathematics, science, language arts, history, social science, physical fitness, geography, and fine arts and subtopics thereof.

7. The visual educational aid of claim 1 further comprising a coordinate system contained on the map, the coordinate system for allowing a user to associate a unique set of coordinates with a geographical feature on the map.

8. The visual educational aid of claim 7 wherein the coordinate system comprises:

(a) a plurality of substantially parallel horizontal grid lines extending across the map; and (b) a plurality of substantially parallel vertical grid lines extending across the map and oriented perpendicularly to the plurality of horizontal grid lines.

9. The visual educational aid of claim 8 further comprising:

(a) a plurality of horizontal reference numbers, each horizontal reference number uniquely associated with a particular horizontal grid line; and (b) a plurality of vertical reference numbers, each vertical reference number uniquely associated with a particular vertical grid line.

10. The visual educational aid of claim 9 wherein the horizontal grid lines and the vertical grid lines form a plurality of substantially square boxes.

11. The visual education aid of claim 1 wherein the geographical features are imaginary.

* * * * *